UNITED STATES PATENT OFFICE.

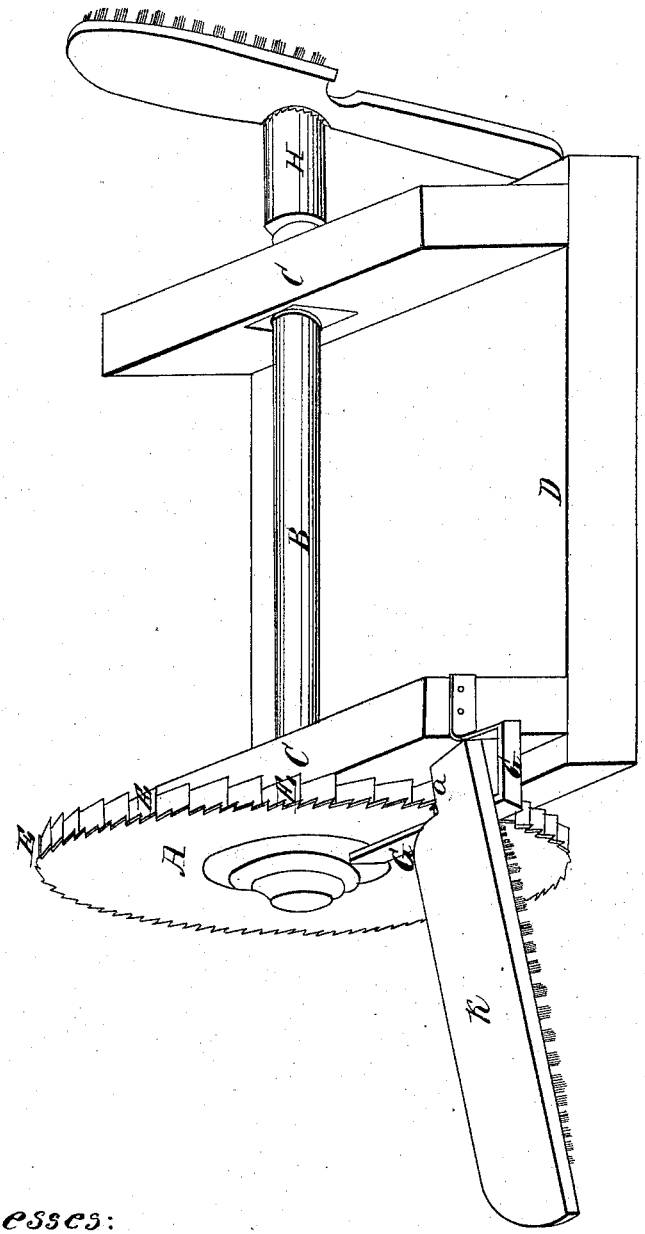

THOS. MITCHELL, OF LANSINGBURG, NEW YORK.

MACHINE FOR MANUFACTURING THE WOODEN PART OF BRUSHES.

Specification of Letters Patent No. 15,702, dated September 9, 1856.

*To all whom it may concern:*

Be it known that I, THOMAS MITCHELL, of Lansingburg, Rensselaer county, State of New York, have invented a new Tool to be Used in the Manufacture of Brushes for the Purpose of Shaping the Stock After the Bristles Have Been Properly Set Therein; and I declare the following specification, with the drawings forming part of the same, to be a full and perfect description thereof.

A represents a circular saw fixed upon its revolving shaft B supported by the two standards C, C, rising upon a platform D. Behind this wheel, and fixed against the saw upon the same shaft is a cutter E a trifle smaller in diameter than A and with coarse teeth equal in profile to three or four of the teeth of A, and in thickness or width of face half an inch or thereabout, being in fact a set of revolving chisels.

The operation of the machine is shown in the drawings where a brush stock is represented as partially sawed, and as being completed; the bristles, which are inserted while the stock is in a rough state being pressed against the gage-bar G, which is an iron bar attached to the standard C, with its outer portion lying parallel with the face of A, and which operates as a gage to direct the cutting line of the saw.

To cut curvilinearly with an ordinary circular saw is next to an impossibility by reason of the resistance of the material to the broad side of the saw at *a* beyond the cutting line. The cutter E obviates the difficulty by removing with its chisel shaped teeth the resisting material at *a*. The result is that with a circular saw, whose teeth are in line with each other and not set, (as it is called) having a cutter attached, as described, curved outlines, provided the curves are in one direction, and form the outer boundary of the article to be shaped can be cut with perfect neatness and precision.

When the curve is reversed and turns inwardly and of a determined size, as the necking of the handle of the brush I use an auxiliary tool attached to the other extremity of the shaft B. This is a crown saw H similar to the well known surgical trepanning saw, made of the required curve, and used as suggested by the drawings.

It is manifest that this apparatus can be used to great advantage wherever curved forms of the kind specified above are to be sawed out, and I propose to use it for such purpose, as well as for a brushmaking tool.

I claim—

1. The combination of a circular saw with a cutting apparatus formed as described, for the purpose of applying circular saws to the cutting of curved figures substantially as set forth in the within specification.

2. I also claim the combination of the apparatus first above claimed with a crown saw attached to an arbor common to both, forming a tool for the advantageous manufacture of brush handles or other analogous work substantially as set forth in the within specification.

Albany, August 9, 1856.

THOMAS MITCHELL.

Witnesses:
A. G. MITCHELL,
RICHD. VARICK DE WITT.